(12) United States Patent
Attar et al.

(10) Patent No.: US 7,054,632 B2
(45) Date of Patent: May 30, 2006

(54) METHOD AND APPARATUS FOR ADAPTIVE SET MANAGEMENT IN A COMMUNICATION SYSTEM

(75) Inventors: Rashid Ahmed Attar, San Diego, CA (US); Rajiv Vijayan, San Diego, CA (US); Nagabhushana T. Sindhushayana, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 650 days.

(21) Appl. No.: 10/007,301

(22) Filed: Nov. 8, 2001

(65) Prior Publication Data

US 2002/0197997 A1 Dec. 26, 2002

Related U.S. Application Data

(63) Continuation-in-part of application No. 09/892,378, filed on Jun. 26, 2001.

(51) Int. Cl.
*H04Q 7/20* (2006.01)

(52) U.S. Cl. ............... 455/436; 455/437; 455/438; 455/439; 455/442; 455/446

(58) Field of Classification Search ............... 455/436, 455/437, 438, 439, 442, 446, 452.2, 13.4, 455/15, 522, 524, 574
See application file for complete search history.

(56) References Cited

U.S. PATENT DOCUMENTS

| | | | |
|---|---|---|---|
| 4,670,899 A * | 6/1987 | Brody et al. | 455/453 |
| 4,901,307 A | 2/1990 | Gilhousen et al. | |
| 5,103,459 A | 4/1992 | Gilhousen et al. | |
| 5,267,261 A | 11/1993 | Blakeney, II et al. | |
| 5,504,773 A | 4/1996 | Padovani et al. | |
| 5,590,126 A * | 12/1996 | Mishra et al. | 455/436 |
| 5,886,988 A | 3/1999 | Yun et al. | 370/329 |
| 5,903,840 A * | 5/1999 | Bertacchi | 455/436 |
| 5,933,462 A | 8/1999 | Viterbi et al. | |
| 5,933,787 A | 8/1999 | Gilhousen et al. | |
| 5,987,326 A * | 11/1999 | Tiedemann et al. | 455/442 |
| 5,999,522 A * | 12/1999 | Rohani | 455/436 |

(Continued)

FOREIGN PATENT DOCUMENTS

EP 0905920 3/1999

(Continued)

*Primary Examiner*—Joseph Feild
*Assistant Examiner*—Huy D. Nguyen
(74) *Attorney, Agent, or Firm*—Philip Wadsworth; Sandra L. Godsey; Pavel Kalousek

(57) ABSTRACT

Methods and apparatus for an adaptive set management in a communication system are disclosed. Certain levels of an imbalance between a forward link and a reverse link are always present in a communication system. Although severe levels of an imbalance cause a detrimental effect on quality of communication and throughput, the imbalance is an issue only if it degrades throughput by one rate on the forward link. Consequently, an adaptive set management evaluates an imbalance among sectors in a subscriber station's list in accordance with the quality metric of the forward link and the reverse link, and removes from the subscriber station's list only a sector that causes severe imbalance. Although retaining a sector in the subscriber station's list may improve throughput, it may negatively affect other functions of the communication system, e.g., power control. Therefore, a method of power control is modified if a level of imbalance affecting the power control is detected.

27 Claims, 2 Drawing Sheets

U.S. PATENT DOCUMENTS

| | | |
|---|---|---|
| 6,205,129 B1 | 3/2001 | Esteves et al. |
| 6,229,795 B1 | 5/2001 | Pankaj et al. |
| 6,233,455 B1 * | 5/2001 | Ramakrishna et al. ...... 455/437 |
| 6,266,529 B1 * | 7/2001 | Chheda ...................... 455/436 |
| 2002/0111169 A1 * | 8/2002 | Vanghi ....................... 455/436 |

FOREIGN PATENT DOCUMENTS

| | | |
|---|---|---|
| WO | 9512297 | 5/1995 |
| WO | 9909660 | 2/1999 |
| WO | 0079809 | 12/2000 |

\* cited by examiner

METHOD AND APPARATUS FOR ADAPTIVE SET MANAGEMENT IN A COMMUNICATION SYSTEM

CROSS REFERENCE

This application is a continuation-in-part of application Ser. No. 09/892,378, filed Jun. 26, 2001, entitled "Method and Apparatus for Selecting a Serving Sector in a Data Communication System," now U.S. Pat. No. 6,757,520, issued Jun. 29, 2004, and currently assigned to the assignee of the present application.

BACKGROUND

1. Field

The present invention relates generally to communication systems, and more specifically to a method and an apparatus for an adaptive set management in a communication system.

2. Background

Communication systems have been developed to allow transmission of information signals from an origination station to a physically distinct destination station. In transmitting information signal from the origination station over a communication channel, the information signal is first converted into a form suitable for efficient transmission over the communication channel. Conversion, or modulation, of the information signal involves varying a parameter of a carrier wave in accordance with the information signal in such a way that the spectrum of the resulting modulated carrier is confined within the communication channel bandwidth. At the destination station the original information signal is replicated from the modulated carrier wave received over the communication channel. Such a replication is generally achieved by using an inverse of the modulation process employed by the origination station.

Modulation also facilitates multiple-access, i.e., simultaneous transmission and/or reception, of several signals over a common communication channel. Multiple-access communication systems often include a plurality of remote subscriber units requiring intermittent service of relatively short duration rather than continuous access to the common communication channel. Several multiple-access techniques are known in the art, such as time division multiple-access (TDMA), frequency division multiple-access (FDMA), and amplitude modulation multiple-access (AM). Another type of a multiple-access technique is a code division multiple-access (CDMA) spread spectrum system that conforms to the "TIA/EIA/IS-95 Mobile Station-Base Station Compatibility Standard for Dual-Mode Wide-Band Spread Spectrum Cellular System," hereinafter referred to as the IS-95 standard. The use of CDMA techniques in a multiple-access communication system is disclosed in U.S. Pat. No. 4,901,307, entitled "SPREAD SPECTRUM MULTIPLE-ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention.

A multiple-access communication system may be a wireless or wire-line and may carry voice and/or data. An example of a communication system carrying both voice and data is a system in accordance with the IS-95 standard, which specifies transmitting voice and data over the communication channel. A method for transmitting data in code channel frames of fixed size is described in detail in U.S. Pat. No. 5,504,773, entitled "METHOD AND APPARATUS FOR THE FORMATTING OF DATA FOR TRANSMISSION," assigned to the assignee of the present invention. In accordance with the IS-95 standard, the data or voice is partitioned into code channel frames that are 20 milliseconds wide with data rates as high as 14.4 Kbps. Additional examples of a communication systems carrying both voice and data comprise communication systems conforming to the "3rd Generation Partnership Project" (3GPP), embodied in a set of documents including Document Nos. 3G TS 25.211, 3G TS 25.212, 3G TS 25.213, and 3G TS 25.214 (the W-CDMA standard), or "TR-45.5 Physical Layer Standard for cdma2000 Spread Spectrum Systems" (the IS-2000 standard).

In a multiple-access communication system, communications between users are conducted through one or more base stations. A first user on one subscriber station communicates to a second user on a second subscriber station by transmitting data on a reverse link to a base station. The base station receives the data and can route the data to another base station. The data is transmitted on a forward link of the same base station, or the other base station, to the second subscriber station. The forward link refers to transmission from a base station to a subscriber station and the reverse link refers to transmission from a subscriber station to a base station. Likewise, the communication can be conducted between a first user on one mobile subscriber station and a second user on a landline station. A base station receives the data from the user on a reverse link, and routes the data through a public switched telephone network (PSTN) to the second user. In many communication systems, e.g., IS-95, W-CDMA, IS-2000, the forward link and the reverse link are allocated separate frequencies.

An example of a data only communication system is a high data rate (HDR) communication system that conforms to the TIA/EIA/IS-856 industry standard, hereinafter referred to as the IS-856 standard. This system in accordance with the IS-856 standard is based on a communication system disclosed in application Ser. No. 08/963,386, entitled "METHOD and apparatus FOR HIGH RATE PACKET DATA transmission," filed Nov. 3, 1997, now U.S. Pat. No. 6,574,211, issued Jun. 3, 2003, assigned to the assignee of the present invention. The communication system in accordance with the IS-856 standard defines a set of data rates, ranging from 38.4 kbps to 2.4 Mbps, at which an access point (AP) may send data to a subscriber station (access terminal, AT). Because the AP is analogous to a base station, the terminology with respect to cells and sectors is the same as with respect to voice systems.

A significant difference between voice services and data services is the fact that the former imposes stringent and fixed delay requirements. Typically, the overall one-way delay of speech frames must be less than 100 ms. In contrast, the data delay can become a variable parameter used to optimize the efficiency of the data communication system. Specifically, more efficient error correcting coding techniques which require significantly larger delays than those that can be tolerated by voice services can be utilized. An exemplary efficient coding scheme for data is disclosed in U.S. patent application Ser. No. 08/743,688, entitled "SOFT DECISION OUTPUT DECODER FOR DECODING CONVOLUTIONALLY ENCODED CODEWORDS," filed Nov. 6, 1996, now U.S. Pat. No. 5,933,462, issued Aug. 3, 1999, and assigned to the assignee of the present invention.

Another significant difference between voice services and data services is that the former requires a fixed and common grade of service (GOS) for all users. Typically, for digital systems providing voice services, this translates into a fixed and equal transmission rate for all users and a maximum tolerable value for the error rates of the speech frames. In contrast, for data services, the GOS can be different from user to user and can be a parameter optimized to increase the overall efficiency of the data communication system. The GOS of a data communication system is typically defined as the total delay incurred in the transfer of a pre-determined amount of data, hereinafter referred to as a data packet.

Yet another significant difference between voice services and data services is that the former requires a reliable communication link. When a mobile station, communicating with a first base station, moves to the edge of the associated cell or sector, the mobile station initiates a simultaneous communication with a second base station. This simultaneous communication, when the mobile station receives a signal carrying equivalent information from two base stations, termed soft handoff, is a process of establishing a communication link with the second base station while maintaining a communication link with the first base station. When the mobile station eventually leaves the cell or sector associated with the first base station, and breaks the communication link with the first base station, it continues the communication on the communication link established with the second base station. Because the soft handoff is a "make before break" mechanism, the soft handoff minimizes the probability of dropped calls. The method and system for providing a communication with a mobile station through more than one base station during the soft handoff process are disclosed in U.S. Pat. No. 5,267,261, entitled "MOBILE ASSISTED SOFT HAND-OFF IN A CDMA CELLULAR TELEPHONE SYSTEM," assigned to the assignee of the present invention. Softer handoff is the process whereby the communication occurs over multiple sectors that are serviced by the same base station. The process of softer handoff is described in detail in co-pending U.S. patent application Ser. No. 08/763,498, entitled "METHOD AND APPARATUS FOR PERFORMING HAND-OFF BETWEEN SECTORS OF A COMMON BASE STATION," filed Dec. 11, 1996, now U.S. Pat. No. 5,933,787, issued Aug. 3, 1999, and assigned to the assignee of the present invention. Thus, both soft and softer handoff for voice services result in redundant transmissions from two or more base stations to improve reliability.

This additional reliability is not required for data transmission because the data packets received in error can be retransmitted. For data services, the parameters, which measure the quality and effectiveness of a data communication system, are the transmission delay required to transfer a data packet and the average throughput rate of the system. Transmission delay does not have the same impact in data communication as in voice communication, but the transmission delay is an important metric for measuring the quality of the data communication system. The average throughput rate is a measure of the efficiency of the data transmission capability of the communication system. Consequently, the transmit power and resources used to support soft handoff can be more efficiently used for transmission of additional data. To maximize the throughput, the transmitting sector should be chosen in a way that maximizes the forward link throughput as perceived by the AT.

The throughput of a communication system may be negatively affected by an imbalance between a forward link and a reverse link. There is, therefore, a need in the art for a method and an apparatus for minimizing such an imbalance.

SUMMARY

In one aspect of the invention, the above stated needs are addressed by communicating from the subscriber station to a sector a request to remove the sector from the subscriber station list, determining a reverse link quality metric from the subscriber station to the sector; and retaining the sector in the subscriber station list if said determined reverse link quality metric is sufficient. The subscriber station communicates the request to remove the sector from the subscriber station list if the subscriber station determines that a forward link quality metric from the sector to the subscriber station is insufficient.

In another aspect of the invention, the above stated needs are addressed by determining a forward link quality metric at which a pre-determined data rate can be decoded, setting a forward link quality metric threshold in accordance with said determined forward link quality metric, and requesting removal of a sector from a subscriber station list if a forward link quality metric of the sector is less than said set forward link quality metric threshold for a pre-determined time interval.

DETAILED DESCRIPTION

Definitions

Figure 1:
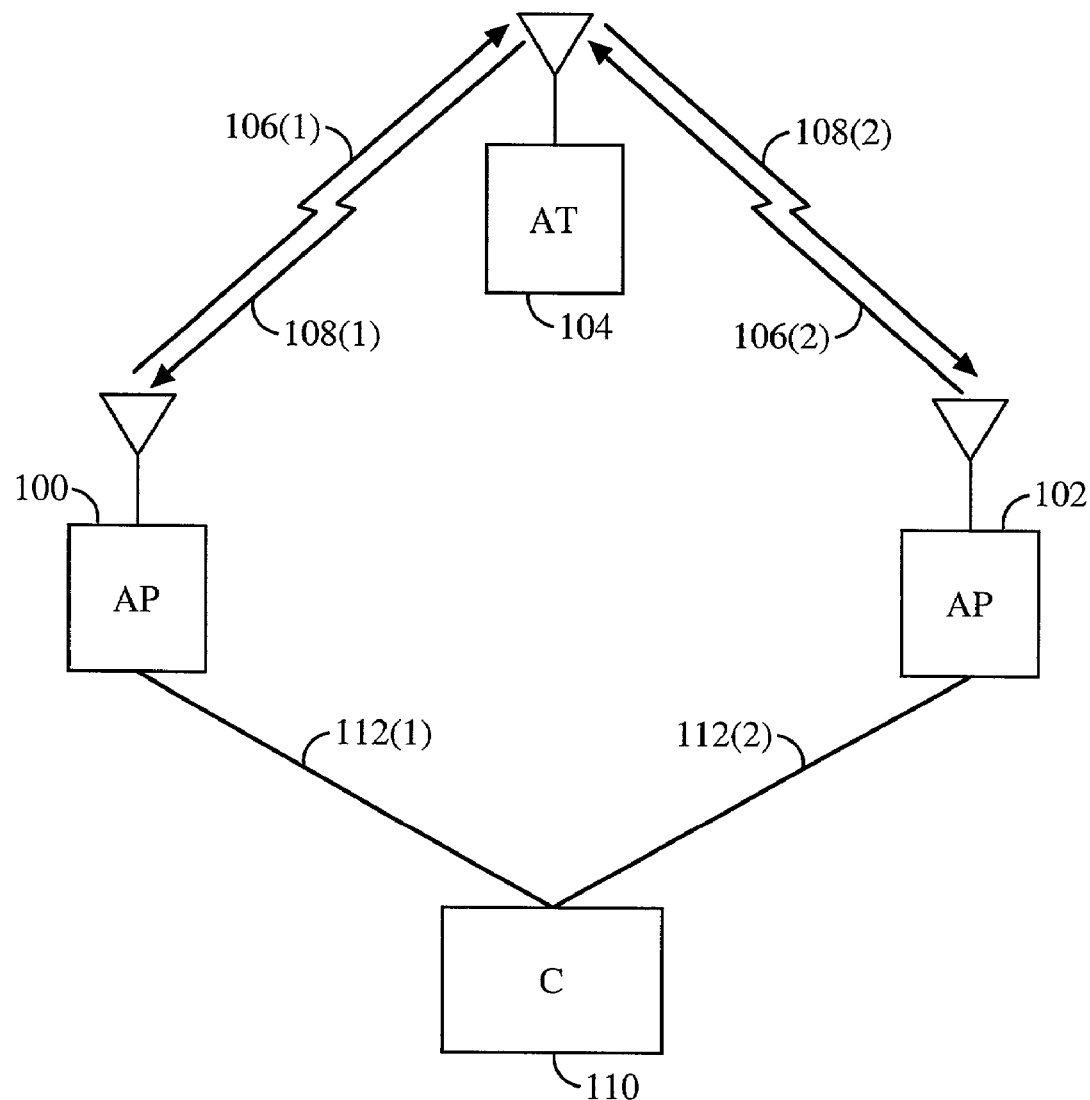
FIG. 1 illustrates a conceptual diagram of a communication system capable of performing re-pointing in accordance with embodiments of the present invention, e.g., a communication system in accordance with the IS-856 standard.

The word "exemplary" is used exclusively herein to mean "serving as an example, instance, or illustration." Although a best mode embodiment is contained herein, an embodiment described as "exemplary" is not necessarily to be construed as preferred or advantageous over other embodiments.

The term packet is used exclusively herein to mean a group of bits, including data (payload) and control elements, arranged into a specific format. The control elements comprise, e.g., a preamble, a quality metric, and others known to one skilled in the art. Quality metric comprises, e.g., a cyclical redundancy check (CRC), a parity bit, and others known to one skilled in the art.

The term access network is used exclusively herein to mean a collection of access points (AP) and one or more access point controllers. The access network transports data packets between multiple access terminals (AT). The access network may be further connected to additional networks outside the access network, such as a corporate Intranet or the Internet, and may transport data packets between each access terminal and such outside networks.

The term base station, referred to herein as an AP in the case of a communication system in accordance with the IS-856 standard, is used exclusively herein to mean the hardware with which subscriber stations communicate. Cell refers to the hardware or a geographic coverage area, depending on the context in which the term is used. A sector is a partition of a cell. Because a sector has the attributes of a cell, the teachings described in terms of cells are readily extended to sectors.

The term subscriber station, referred to herein as an AT in the case of a communication system in accordance with the IS-856 standard, is used herein to mean the hardware with which an access network communicates. An AT may be mobile or stationary. An AT may be any data device that communicates through a wireless channel or through a wired channel, for example using fiber optic or coaxial cables. An AT may further be any of a number of types of devices including but not limited to PC card, compact flash, external or internal modem, or wireless or wireline phone. An AT that is in the process of establishing an active traffic channel connection with an AP is said to be in a connection setup state. An AT that has established an active traffic channel connection with an AP is called an active AT, and is said to be in a traffic state.

The term communication channel/link is as used herein to mean a single route over which a signal is transmitted described in terms of modulation characteristics and coding, or a single route within the protocol layers of either the AP or the AT.

The term reverse channel/link is as used herein means a communication channel/link through which the AT sends signals to the AP.

A forward channel/link is as used herein to mean a communication channel/link through which an AP sends signals to an AT.

The term soft handoff is as used herein to mean a communication between a subscriber station and two or more sectors, wherein each sector belongs to a different cell. In the context of IS-95 standard, the reverse link communication is received by both sectors, and the forward link communication is simultaneously carried on the two or more sectors' forward links. In the context of the IS-856 standard, data transmission on the forward link is non-simultaneously carried out between one of the two or more sectors and the AT.

The term softer handoff is as used herein to mean a communication between a subscriber station and two or more sectors, wherein each sector belongs to the same cell. In the context of the IS-95 standard, the reverse link communication is received by both sectors, and the forward link communication is simultaneously carried on one of the two or more sectors' forward links. In the context of the IS-856 standard, data transmission on the forward link is non-simultaneously carried out between one of the two or more sectors and the AT.

The term re-pointing is as used herein to mean a selection of a sector that is a member of AT's active list, wherein the sector is different than a currently selected sector.

The term serving sector is as used herein to mean a sector that a particular AT selected for data communication or a sector that is communicating data to the particular AT.

The term soft/softer handoff delay is as used herein to indicate the minimum interruption in service that a subscriber station would experience following a handoff to another sector. Soft/Softer handoff delay is determined based on whether the sector, (currently not serving the subscriber station), (non-serving sector) to which the subscriber station is re-pointing is part of the same cell as the current serving sector. If the non-serving sector is in the same cell as the serving sector then the softer handoff delay is used, and if the non-serving sector is in a cell different from the one that the serving sector is part of, then the soft handoff delay is used.

The term non-homogenous soft/softer handoff delay is as used herein to indicate that the soft/softer handoff delays are sector specific and therefore, may not uniform across the sectors of an Access Network.

The term credit is used herein to mean a dimensionless attribute indicating a reverse link quality metric, a quality metric of a forward link, or a composite quality metric of both forward and reverse links.

The term erasure is used herein to mean failure to recognize a message.

The term outage is used herein to mean a time interval during which the likelihood that a subscriber station will receive service is reduced.

The term fixed rate mode is used herein to mean that a particular sector transmits a Forward Traffic Channel to the AT at one particular rate.

Description

FIG. 1 illustrates a conceptual diagram of a communication system capable of performing re-pointing in accordance with embodiments of the present invention, e.g., a communication system in accordance with the IS-856 standard. An AP 100 transmits data to an AT 104 over a forward link 106(1), and receives data from the AT 104 over a reverse link 108(1). Similarly, an AP 102 transmits data to the AT 104 over a forward link 106(2), and receives data from the AT 104 over a reverse link 108(2). In accordance with one embodiment, data transmission on the forward link occurs from one AP to one AT at or near the maximum data rate that can be supported by the forward link and the communication system. Other channels of the forward link, e.g., control channel, may be transmitted from multiple AP's to one AT. Reverse link data communication may occur from one AT to one or more AP's. The AP 100 and the AP 102 are connected to a controller 110 over backhauls 112(1) and 112(2). The term backhaul is used to mean a communication link between a controller and an AP. Although only two AT's and one AP are shown in FIG. 1, one of ordinary skill in the art recognizes that this is for pedagogical purposes only, and the communication system can comprise a plurality of AT's and AP's.

Initially, the AT 104 and one of the AP's, e.g., the AP 100, establish a communication link using a pre-determined access procedure. In this connected state, the AT 104 is able to receive data and control messages from the AP 100, and is able to transmit data and control messages to the AP 100. The AT 104 continually searches for other AP's that could be added to the AT 104 active set. The active set comprises a list of the AP's capable of communication with the AT 104. When such an AP is found, the AT 104 calculates a quality metric of the AP's forward link, which in accordance with one embodiment comprises a signal-to-interference-and-noise ratio (SINR). In accordance with one embodiment, the AT 104 searches for other APs and determines the AP's SINR in accordance with a pilot signal. Simultaneously, the AT 104 calculates the forward link quality metric for each AP in the AT 104 active set. If the forward link quality metric from a particular AP is above a predetermined add threshold or below a pre-determined drop threshold for a predetermined period of time, the AT 104 reports this information to the AP 100. Subsequent messages from the AP 100 direct the AT 104 to add to or to delete from the AT 104 active set the particular AP.

The AT 104 selects a serving AP from the active set based on a set of parameters. The set of parameters can comprise present and previous SINR measurements, a bit-error-rate and/or a packet-error-rate, and other parameters known to one skilled in the art. In accordance with one embodiment, the serving AP is selected in accordance with the largest SINR measurement. The AT 104 then transmits to the selected AP a data request message (DRC message) on the data request channel (DRC channel). The DRC message can contain the requested data rate or, alternatively, an indication of the quality of the forward link, e.g., the measured SINR, the bit-error-rate, or the packet-error-rate. In accordance with one embodiment, the AT 104 can direct the transmission of the DRC message to a specific AP by the use of a Walsh code, which uniquely identifies the specific AP. The DRC message symbols are exclusively OR'ed (XOR) with the unique Walsh code. The XOR operation is referred to as Walsh covering of a signal. Since each AP in the active set of the AT 104 is identified by a unique Walsh code, only the selected AP which performs the identical XOR operation as that performed by the AT 104 with the correct Walsh code can correctly decode the DRC message.

The data to be transmitted to the AT 104 arrive at the controller 110. In accordance with one embodiment, the controller 110 sends the data to all APs in AT 104 active set over the backhaul 112. In another embodiment, the controller 110 first determines, which AP was selected by the AT 104 as the serving AP, and then sends the data to the serving AP. The data are stored in a queue at the AP(s). A paging message is then sent by one or more APs to the AT 104 on respective control channels. The AT 104 demodulates and decodes the signals on one or more control channels to obtain the paging messages.

At each time time-slot, the AP can schedule data transmission to any of the ATs that received the paging message. An exemplary method for scheduling transmission is described in U.S. Pat. No. 6,229,795, entitled "System for allocating resources in a communication system," assigned to the assignee of the present invention. The AP uses the rate control information received from each AT in the DRC message to efficiently transmit forward link data at the highest possible rate. In accordance with one embodiment, the AP determines the data rate at which to transmit the data to the AT 104 based on the most recent value of the DRC message received from the AT 104. Additionally, the AP uniquely identifies a transmission to the AT 104 by using a spreading code which is unique to that mobile station. In the exemplary embodiment, this spreading code is the long pseudo noise (PN) code, which is defined by the IS-856 standard.

The AT 104, for which the data packet is intended, receives the data transmission and decodes the data packet. In accordance with one embodiment, each data packet is associated with an identifier, e.g., a sequence number, which is used by the AT 104 to detect either missed or duplicate transmissions. In such an event, the AT 104 communicates via the reverse link data channel the sequence numbers of the missing data units. The controller 110, which receives the data messages from the AT 104 via the AP communicating with the AT 104, then indicates to the AP what data units were not received by the AT 104. The AP then schedules a retransmission of such data units.

When the communication link between the AT 104 and the AP 100, operating in the variable rate mode, deteriorates below required reliability level, the AT 104 first attempts to determine whether communication with another AP in the variable rate mode supporting an acceptable rate data is possible. If the AT 104 ascertains such an AP (e.g., the AP 102), a re-pointing to the AP 102, therefore, to a different communication link occurs, and the data transmissions continue from the AP 102 in the variable rate mode. The above-mentioned deterioration of the communication link can be caused by, e.g., the AT 104 moving from a coverage area of the AP 100 to the coverage area of the AP 102, shadowing, fading, and other reasons known to one skilled in the art. Alternatively, when a communication link between the AT 104 and another AP (e.g., the AP 102) that may achieve higher throughput rate that the currently used communication link becomes available, a re-pointing to the AP 102, therefore, to a different communication link occurs, and the data transmissions continue from the AP 102 in the variable rate mode. If the AT 104 fails to detect an AP that can operate in the variable rate mode and support an acceptable data rate, the AT 104 transitions into a fixed rate mode.

In accordance with one embodiment, the AT 104 evaluates the communications links with all candidate APs for both variable rate data and fixed rate data modes, and selects the AP, which yields the highest throughput.

The AT 104 will switch from the fixed rate mode back to the variable rate mode if the sector is no longer a member of the AT 104 active set.

In the exemplary embodiment, the above described the fixed rate mode and associated methods for transition to and from the fixed mode are similar to those disclosed in detail in U.S. Pat. No. 6,205,129, entitled "METHOD AND APPARATUS FOR VARIABLE AND FIXED FORWARD LINK RATE CONTROL IN A MOBILE RADIO COMMUNICATION SYSTEM", assigned to the assignee of the present invention. Other fixed rate modes and associated methods for transition to and from the fixed mode can also be contemplated and are within the scope of the present invention.

One skilled in the art recognizes that an AP can comprise one or more sectors. In the description above, the term AP was used generically to allow clear explanation of basic concepts of the communication system illustrates a conceptual diagram of a communication system capable of performing re-pointing in accordance with embodiments of the present invention, e.g., a communication system in accordance with the IS-856 standard. However, one skilled in the art can extend the explained concepts to AP comprising any number of sectors. Consequently, the concept of sector will be used throughout the rest of the document.

Forward Link Structure

Figure 2:
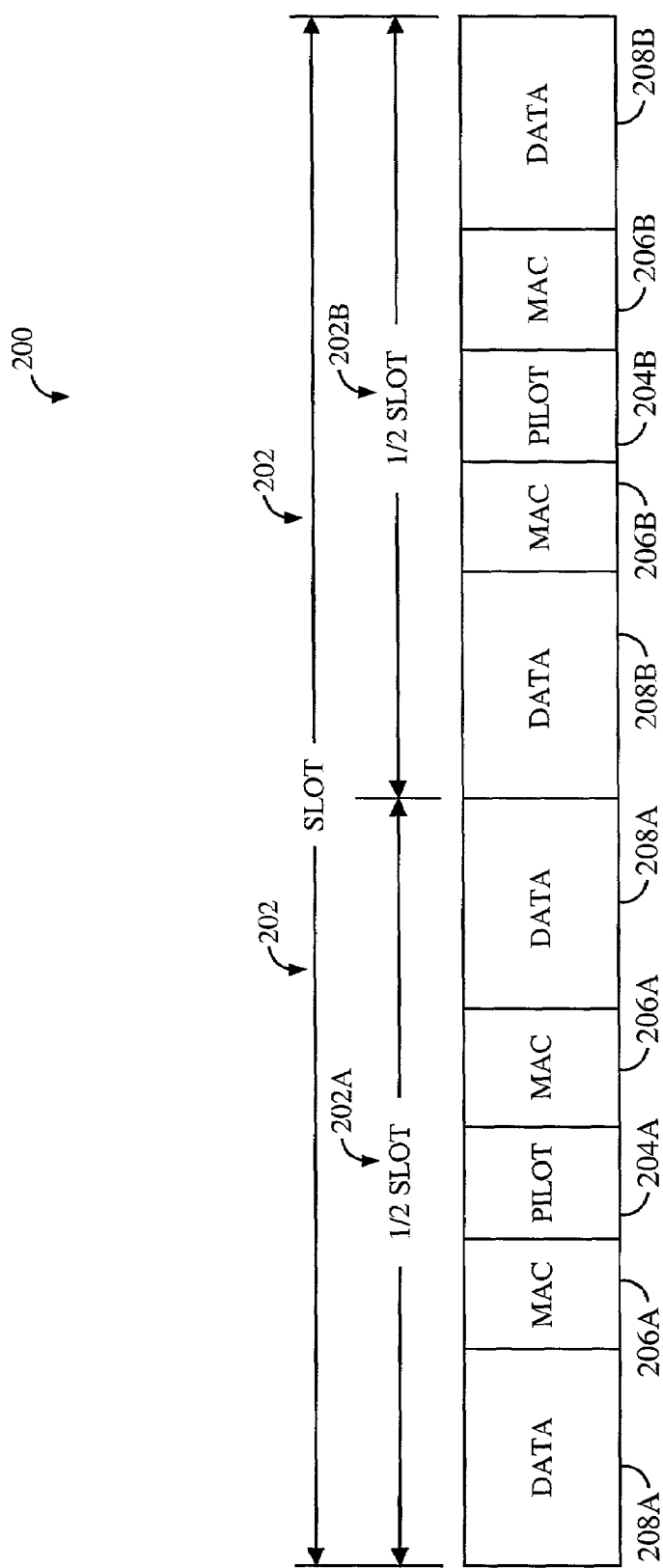
FIG. 2 illustrates an exemplary forward link waveform.

FIG. 2 illustrates an exemplary forward link waveform 200. For pedagogical reasons, the waveform 200 is modeled after a forward link waveform of the above-mentioned communication system in accordance with the IS-856 standard. However, one of ordinary skill in the art will understand that the teaching is applicable to different waveforms. Thus, for example, in accordance with one embodiment, the waveform does not need to contain pilot signal bursts, and the pilot signal can be transmitted on a separate channel, which can be continuous or bursty. The forward link 200 is defined in terms of frames. A frame is a structure comprising 16 time-slots 202; each time-slot 202 being 2048 chips long, corresponding to 1.66 ms time-slot duration, and, consequently, 26.66 ms frame duration. Each time-slot 202 is divided into two half-time-slots 202A, 202B, with pilot bursts 204A, 204B transmitted within each half-time-slot 204A, 204B. In the exemplary embodiment, each pilot burst 204A, 204B is 96 chips long, and is centered at the midpoint of its associated half-time-slot 202A, 202B. The pilot bursts 204A, 204B comprise a pilot channel signal covered by a Walsh cover with index 0. A forward medium access control channel (MAC) 206 forms two bursts, which are transmitted immediately before and immediately after the pilot burst 204 of each half-time-slot 202. In the exemplary embodiment, the MAC is composed of up to 64 code channels, which are orthogonally covered by 64-ary Walsh codes. Each code channel is identified by a MAC index, which has a value between 1 and 64, and identifies a unique 64-ary Walsh cover. One of the available MAC indices between 5 and 63 is used for reverse link power control (RLPC) for each subscriber station. The reverse link power control is modulated on a reverse power control channel (RPC). MAC index 4 is used for a reverse activity channel (RA), which performs load control on the reverse traffic channel. The forward link traffic channel and control channel payload is sent in the remaining portions 208A of the first half-time-slot 202A and the remaining portions 208B of the second half-time-slot 202B.

As discussed, the RPC channel is used to send the power control commands, which are used to control the transmit power of the reverse link transmission from an AT. Power control is critical on the reverse link because the transmit power of each AT is an interference to other ATs in the communication system. To minimize interference on the reverse link and maximize capacity, the transmit power of each AT is controlled by two power control loops. In one embodiment, the power control loops are similar to that of the CDMA system disclosed in detail in U.S. Pat. No. 5,056,109, entitled "METHOD AND APPARATUS FOR CONTROLLING TRANSMISSION POWER IN A CDMA CELLULAR MOBILE TELEPHONE SYSTEM," assigned to the assignee of the present invention and incorporated by reference herein. Other power control mechanism can also be contemplated and are within the scope of the present invention.

The first (open) power control loop sets a level at which a reverse link quality metric is to be maintained. The signal quality is measured as the energy-per-bit-to-noise-plus-interference ratio Eb/Io of the reverse link signal received at an AP. The set level is referred to as the Eb/Io set point. The open power control loop adjusts the set point such that the desired level of performance, as measured by the packet-error-rate (PER), is maintained. The second (closed) power control loop adjusts the transmit power of an AT such that the reverse link signal quality is maintained at the set level.

The closed loop power control for an AT is performed by all APs in the AT's Active Set. Within the closed loop, the Eb/Io of the reverse link signal is measured at each of the AP. Each AP then compares the measured Eb/Io with the set point. If the measured Eb/Lo is greater than the set point, each AP transmits a power control message to AT to decrease the transmit power. Alternatively, if the measured Eb/Io is below the set point, each AP transmits a power control message to AT to increase the transmit power. In one embodiment, the power control message is implemented with one power control bit sent on the RPC channel (RPC bit). An AP transmits '0' ("up") RPC bit if the measured Eb/Io is below the set point, and '1' ("down") RPC bit if the measured Eb/Io is greater than the set point. The AT adjusts the AT's output power by increasing an output power if the RPC bits received from all controlling APs are '0' ("up"). If any RPC bit received from the controlling APs is '1' ("down"), the AT decreases the output power.

Re-pointing with a Modified Set Management

In a wireless communications system, e.g., a wireless communications system in accordance with FIG. 1, an imbalance may occur between a forward link and a reverse link. Imbalance occurs when a forward link quality metric of a first sector is greater than the forward link quality metric of a second sector as measured at an AT, and a quality metric of the AT's reverse link as measured at the first sector is less than a quality metric as measured at the second sector. It has been observed that low levels of imbalance, e.g., less than 1 dB are almost always present in a communication system. This level of imbalance appears to have little impact either on the forward link requested/served rate or on the DRC erasure rate on the reverse link. As used herein the term DRC erasure rate indicates a percentage of DRC messages that is erased at the AP. Consequently, such an imbalance is accepted because the cost, e.g., outage associated with re-pointing DRC's in a dynamic communication system environment (changing channel conditions, AT mobility), far exceeds the small penalty in forward link sector throughput that may result.

As the imbalance increases, the sector with the better forward link quality metric has a higher DRC erasure rate, due to worse reverse link quality metric. Consequently, the advantage of an AT pointing its DRC to a sector with a better forward link quality metric is reduced because the DRC erasure rate at the sector with the better forward link quality metric may be so large as to reduce the forward link throughput significantly. In an extreme case, if the DRC erasure rate is 100%, regardless of the forward link quality metric, the AT is not served. On the other hand, re-pointing the AT's DRC to a sector with a better reverse link quality metric may not improve the forward link throughput because the sector's forward link quality metric is reduced.

Because the actual forward link throughput that an AT achieves is a function of the data queues to the AT and forward link scheduling method, the forward link throughput cannot be known a priori. Therefore, a re-pointing method attempts to select the best sector assuming that data queues are full and that the scheduling method would select the AT for service. The re-pointing method further considers that from an AT standpoint, imbalance is an issue only if it degrades the AT's throughput by one rate on the forward link. For example, consider a static channel with the following conditions:

(i) sector 1 forward link quality metric FL1_SINR is 3 dB higher than sector 2 forward link quality metric FL2_SINR as measured by the AT. Therefore, in accordance with a relation between a forward link SINR and a rate of data, the forward link of sector 1 can support 614 kB rate, and the forward link of sector 2 can support 307 kB rate; and (ii) a quality metric of the AT's reverse link as measured at sector 1, expressed as the reverse link pilot channel SINR (Ecp/Nt), RL1_Ecp/Nt is 3 dB lower than a quality metric RL2_Ecp/Nt as measured at sector 2. Therefore, in accordance with a relation between a reverse link pilot channel SINR and a DRC erasure rate, the DRC erasure Rate of RL1 is 0.8, and the DRC erasure Rate of RL2 is 0.1.

Consequently, if the AT sends a DRC request message to sector 1, it receives a higher throughput if the AT is served, but the likelihood of the AT being served is less than or equal to 20% because the Erasure Rate of RL1 is 0.8. If the AT sends a DRC request message to sector 2, the AT receives a lower throughput if the AT is served, but the likelihood of it being served is greater than or equal to 90% because the Erasure Rate of RL2 is 0.1. Therefore, the throughput from sector 1 is 614 kB*0.2 =122.8 kB, and the throughput from sector 2 is 307 k*0.9=276.3 k. Clearly, the AT may gain from sending a DRC request message to sector 2.

Let us assume that in a communication system of FIG. 1, the forward link quality metric 106(1) is greater than the quality metric of the forward link 106(2), and the quality metric of the reverse link 108(1) is less than the quality metric of the reverse link 108(2), causing a severe imbalance as described above. As discussed, the AT utilizes a pre-determined add threshold and a pre-determined drop threshold for managing the AT's active set. In accordance with one embodiment, if the SINR of the forward link 106(2) stays below the pre-determined drop threshold for a period equal to or greater than a pre-determined time period, the AT requests that the sector at AP 102 be removed from the AT active set. However, the above-discussed example illustrated that removing a sector may negatively affect throughput.

Therefore, set management method is implemented at the sectors. According to one embodiment, when the AT determines that a forward link quality metric for a sector fell below a drop threshold, the AT sends a request via a Route Update message to the access network to remove the sector from the AT's active set. If the Access Network set management method determines that the reverse link associated with this forward link has a sufficient quality metric, the drop threshold for that sector is modified in accordance with a minimal threshold at which a desired data rate can be decoded. For example, in accordance with one embodiment, the minimal forward link SINR threshold for decoding the lowest data rate of 38.4 kbps equals −11.5 dB. Therefore, if reception of the data rate of 38.4 kbps the modified drop threshold is set to −12 dB.

In another embodiment, a change of the active set of the AT in response to the Route Update message is at the discretion of the AP. Therefore, when the AT determines that a forward link quality metric for a sector fell below a drop threshold, the AT sends a request via a Route Update message to the access network to remove the sector from the AT's active set. In order to preserve throughput, the access network set management method may determine that a reverse link associated with the forward link of the sector at AP 102 has a sufficient quality metric, and deny the request. By lowering the threshold, the AP 102 implicitly denies the AT's request to remove that AP from the active set. The AP's set management method retains the information of the AT request. Thus, if the associated reverse link SINR deteriorates, the AP's set management method may delete the particular pilot signal from the active set at a later instant even prior to another Route Update message from the AT, where the another Route Update message is sent on detecting other potential changes to the active set at the AT.

In accordance with the described embodiments of the set management method, the access network has discretion to modify a drop threshold for a sector. Alternatively, the access network has discretion to retain a sector in an AT's active set although the sector's forward link quality metric deteriorated. Both actions may have negative effect on reverse link power control by creating a severe imbalance. Referring back to FIG. 1, because the sector at the AP 100 experiences the reverse link 108(1) with low quality metric, therefore, the sector sends "up" RPC bits. On the other hand, a sector at the AP 102 experiences reverse link 108(2) with good quality metric, therefore, the sector sends "up" and "down" commands that will on average maintain the reverse link's quality metric. Because, as discussed, an AT decreases reverse link transmit power if one of all RPC bits is down, the reverse link transmit power of the AT 104 is effectively controlled by the sector AP 100 with lower forward link quality metric.

The power required for an RPC bit intended for ATs power controlled by a sector differ in accordance with the quality metric of the sector's forward link as measured at each of the ATs. An AT, receiving the forward link with better quality metric requires less power than an AT, receiving the forward link with worse quality metric. An allocation algorithm using DRC information to allocate power among the different ATs in proportion to the ATs' forward link quality metric is disclosed in detail in a application Ser. No. 09/669,950, entitled "Method and apparatus for allocation of power to Base Station channels," filed Sep. 25, 2000, now U.S. Pat. No. 6,678,257, issued Jan. 13, 2004, and assigned to the assignee of the present invention. Because the sum of the powers of all medium access control channels is finite, the power allocated for the RPC bit to the AT experiencing low quality metric of a sector's forward link can be insufficient for a reliable reverse link power control.

Consequently, a reverse link power control may be negatively affected, if a sector retained in the AT's active list does not have enough power to allocate to the RPC bit for the AT. Therefore, in one embodiment, when the access network receives a request to remove a sector from an AT's active set, and the access network determines if an imbalance that would affect power control exists. If the access network further determines that denying the request may increase throughput, the access network power controls the AT in accordance with an embodiment of the invention. One skilled in the art appreciates, that although the set management method has been described as triggered by a request to remove a sector from an AT's list, such was only for tutorial purposes. For example, the access network may monitor throughput and an effect of imbalance on throughput and take an action before the request to remove a sector occurs.

Referring back to FIG. 1, it was discussed that the reverse link transmit power of the AT 104 is effectively controlled by the sector at the AP 100 with lower forward link quality metric. Because, as discussed, the RPC bits controlling the reverse link transmit power of the AT 104 may have insufficient power, thus result in incorrect reverse link transmit power control, therefore, a decreased capacity. Consequently, in one embodiment, the access network directs the sector at the AP 100 to disregard the DRC of the reverse link 108(1) and provides the sector at the AP 100 with RPC bits determined by the reverse link 108(2).

One of ordinary skill in the art understands that extension to more than two sectors yields more variants. For example, only the sector with the highest forward link quality metric may be provided the power control commands from the reverse link with the highest quality metric. In another example, the two sectors with the highest forward link quality metric may be provided the power control commands from the reverse link with the highest quality metric. All these variants are contemplated as being within the spirit and scope of the present invention.

In one embodiment, the imbalance is determined by evaluating for each frame and each pair of sectors, power controlling an AT, quality metrics of the forward links and quality metrics of the reverse links. Imbalance is declared if the following equations are satisfied for n frames out of m frames.

$$\text{FLQM\_Sector(i)} > \text{FLQM\_Sector(j)} + \Delta\text{QMFL} \quad (1)$$

$$\text{RLQM\_Sector(i)} < \text{RLQM\_Sector(j)} + \Delta\text{QMRL} \quad (2)$$

where: FLQM_Sector(i) is a forward link quality metric of the i-th sector;

RLQM_Sector(i) is a reverse link quality metric of the i-th sector;

$\Delta$QMFL is a predetermined value a forward link quality metric; and $\Delta$QMRL is a predetermined value a reverse link quality metric.

One of ordinary skill in the art appreciates that a choice of 'n' and 'm' is communication system dependent. Furthermore, other methods for determining imbalance are equally applicable, and can be utilized without departing from the spirit or scope of the invention.

One skilled in the art will appreciate that the effects of the link imbalance and the method of adjusting of the predetermined drop threshold has been described with respect to a communication system of FIG. 1 for pedagogical purposes only. The effects of link imbalance affect every communications system utilizing soft handoff, regardless of whether the communications system is for data services, voice services or both. Consequently, the above-disclosed method can be utilized as long as the management of sectors, equivalent to management of active set, is employed by the communication system. Consequently, such communication system includes, but is not limited to, systems in accordance with the IS-95 standards, the W-CDMA standard, and the IS-2000 standard.

Those of ordinary skill in the art will recognize that although the various embodiments were described in terms of flowcharts and methods, such was done for pedagogical purposes only. The methods can be performed by an apparatus, which in one embodiment comprises a processor interfaced with a transmitter, a receiver and any other appropriate blocks of the AT and/or AP.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method for managing a list of sectors capable of communication with a subscriber station in a communication system, comprising:

receiving a request to remove a sector from the subscriber station's list;

determining a reverse link quality metric from the subscriber station at the sector;

retaining the sector in the subscriber station's list if said determined reverse link quality metric is sufficient; and sending the retained sector a data request message on a data request channel; determining whether an imbalance exists when the sector is retained in the subscriber station's list; and transmitting from at least the sector with the highest forward link quality metric a power control command determined in accordance with the highest reverse link quality metric if the imbalance exists; wherein said determining whether an imbalance exists comprises: measuring at each sector belonging to the list reverse link quality metrics of a subscriber station; determining at each sector belonging to the list a quality metric of a forward link transmitted by the sector to the subscriber station; and declaring the imbalance if: the forward link quality metric of one of the plurality of sectors is greater than a forward link quality of the rest of the plurality sectors by a first threshold; and said measured reverse link quality metric at the one of the plurality sectors is less than said measured reverse link quality at the rest of the plurality sectors by a second threshold.

2. The method as claimed in claim 1, wherein said retaining the sector in the subscriber station's list if said determined reverse link quality metric is sufficient comprises:

declining said received request to remove a sector from the subscriber station's list.

3. The method as claimed in claim 1, wherein said retaining the sector in the subscriber station's list if said determined reverse link quality metric is sufficient comprises:

determining a forward link quality metric at which a rate of data can be decoded; and setting a forward link quality metric threshold for the sector in accordance with said determined forward link quality metric.

4. The method as claimed in claim 3, wherein said determining a forward link quality metric at which a rate of data can be decoded comprises:

determining a forward link quality metric at which a minimum rate of data can be decoded.

5. The method as claimed in claim 1 further comprising removing the sector from the subscriber station list if said determined reverse link quality metric is insufficient.

6. The method as claimed in claim 1 wherein the communication system comprises the communication system in accordance with IS-856 standard.

7. The method as claimed in claim 1 wherein the communication system comprises the communication system in accordance with IS-95 standard.

8. The method as claimed in claim 1 wherein the communication system comprises the communication system in accordance with Wideband Code-Division-Multiple-Access (WCDMA) standard.

9. The method as claimed in claim 1 wherein the communication system comprises the communication system in accordance with IS-2000 standard.

10. The method as claimed in claim 1 wherein the communication system comprises the communication system in accordance with JSTD-008 standard.

11. The method as claimed in claim 1, further comprising:
determining a forward link quality metric from a sector; and
communicating from the subscriber station a request to remove the sector from the subscriber station list if said determined forward link quality metric is insufficient.

12. An apparatus for managing a list of sectors capable of communication with a subscriber station in a communication system, comprising:
a receiver configured to:
receive a request to remove a sector from the subscriber station's list;
a processor communicatively coupled to said receiver; and
a storage medium communicatively coupled to said processor and containing a set of instructions executable by the processor to:
determine a reverse link quality metric from the subscriber station at the sector; and
retain the sector in the subscriber station list if said determined reverse link quality metric is sufficient; wherein said set of instructions executable by the processor comprises a set of instructions to: determine whether an imbalance exists when the sector is retained in the subscriber station's list; and if the imbalance exists then: provide to at least the sector with the highest forward link quality metric a power control command determined in accordance with the highest reverse link quality metric; wherein said set of instructions executable by the processor determine whether an imbalance exists comprises a set of instructions to: determine at each sector belonging to the list reverse link quality metrics of a subscriber station; determine at each sector belonging to the list a quality metric of a forward link transmitted by the sector to the subscriber station; and declare the imbalance if: the forward link quality metric of one of the plurality of sectors is greater than a forward link quality of the rest of the plurality sectors by a first threshold; and said measured reverse link quality metric at the one of the plurality sectors is less than said measured reverse link quality at the rest of the plurality sectors by a second threshold.

13. The apparatus as claimed in claim 12, wherein said set of instructions executable by the processor to retain the sector in the subscriber station's list if said determined reverse link quality metric is sufficient comprises a set of instructions to:
decline said received request to remove a sector from the subscriber station's list.

14. The apparatus as claimed in claim 12, wherein said set of instructions executable by the processor to retain the sector in the subscriber station's list if said determined reverse link quality metric is sufficient comprises a set of instructions to:
determine a forward link quality metric for the sector at which a rate of data can be decoded; and
set a forward link quality metric threshold in accordance with said determined forward link quality metric.

15. The apparatus as claimed in claim 12, further comprising:
a second receiver configured to measure a forward link quality metric; and
a second transmitter communicatively coupled to said second receiver configured to communicate from the subscriber station to a request to remove the sector from the subscriber station list if said determined forward link quality metric is insufficient.

16. The apparatus as claimed in claim 12, further comprising instructions to remove the sector from the subscriber station list if said determined reverse link quality metric is insufficient.

17. The apparatus as claimed in claim 12 wherein the communication system comprises the communication system in accordance with IS-856 standard.

18. The apparatus as claimed in claim 12 wherein the communication system comprises the communication system in accordance with IS-95 standard.

19. The apparatus as claimed in claim 12 wherein the communication system comprises the communication system in accordance with Wideband Code-Division-Multiple-Access (WCDMA) standard.

20. The apparatus as claimed in claim 12 wherein the communication system comprises the communication system in accordance with IS-2000 standard.

21. The apparatus as claimed in claim 12 wherein the communication system comprises the communication system in accordance with JSTD-008 standard.

22. A method for power controlling a subscriber station, comprising:
measuring at a plurality of sectors belonging to the subscriber station's list a reverse link quality metrics of the subscriber station;
determining at each of the sectors a quality metric of a forward link transmitted by the sector to the subscriber station;
determining an imbalance in accordance with said measured reverse link quality metrics, and said determined quality metrics of forward links; and
transmitting from the sector with the highest forward link quality metric a power control command determined in accordance with the highest reverse link quality metric if the imbalance exists; wherein said determining an imbalance in accordance with said measured reverse link quality metrics, and said determined quality metrics of forward links comprises: declaring the imbalance if: the forward link quality metric of one of the plurality of sectors is greater than a forward link quality of the rest of the plurality sectors by a first threshold; and said measured reverse link quality metric at the one of the plurality sectors is less than said measured reverse link quality at the rest of the plurality sectors by a second threshold.

23. The method as claimed in claim 22 wherein said transmitting from the sector with the highest forward link quality metric a power control command determined in accordance with the highest reverse link quality metric if the imbalance exists comprises:
    transmitting from the sector with the highest forward link quality metric a power control command determined in accordance with the highest reverse link quality metric if the imbalance exists for a pre-determined time.

24. The method as claimed in claim 22 wherein said measuring at a plurality of sectors belonging to the subscriber station's list a reverse link quality metrics of the subscriber station comprises:
    measuring at two of sectors belonging to the subscriber station's list a reverse link quality metrics of the subscriber station.

25. An apparatus for power controlling a subscriber station, comprising:
    a processor communicatively coupled to said receiver; and
    a storage medium communicatively coupled to said processor and containing a set of instructions executable by the processor to:
    determine at each sector belonging to the list reverse link quality metrics of a subscriber station;
    determine at each sector belonging to the list a quality metric of a forward link transmitted by the sector to the subscriber station;
    determine an imbalance in accordance with said measured reverse link quality metrics, and said determined quality metrics of forward links: and
    provide to the sector with the highest forward link quality metric a power control command determined in accordance with the highest reverse link quality metric;
    wherein said set of instructions executable by the processor to determine imbalance in accordance with said measured reverse link quality metrics, and said determined quality metrics of forward links comprises a set of instructions to: declaring the imbalance if: the forward link quality metric of one of the plurality of sectors is greater than a forward link quality of the rest of the plurality sectors by a first threshold; and said measured reverse link quality metric at the one of the plurality of sectors is less than said measured reverse link quality at the rest of the plurality sectors by a second threshold.

26. The apparatus as claimed in claim 25 wherein said set of instructions to provide to the sector with the highest forward link quality metric a power control command determined in accordance with the highest reverse link quality metric comprises a set of instruction to:
    provide to the sector with the highest forward link quality metric a power control command determined in accordance with the highest reverse link quality metric if the imbalance exists for a pre-determined time.

27. The apparatus as claimed in claim 25 wherein said list includes two sectors.

* * * * *